(12) United States Patent
Marotta et al.

(10) Patent No.: US 7,293,830 B2
(45) Date of Patent: Nov. 13, 2007

(54) SHOCK-MITIGATING BOLSTER

(75) Inventors: Christopher J. Marotta, Cutchogue, NY (US); Robert DiGregorio, Cutchogue, NY (US)

(73) Assignee: Stidd Systems, Inc., Greenport, NY (US)

( * ) Notice: Subject to any disclaimer, the term of this patent is extended or adjusted under 35 U.S.C. 154(b) by 72 days.

(21) Appl. No.: 11/170,043

(22) Filed: Jun. 29, 2005

(65) Prior Publication Data

US 2007/0001491 A1    Jan. 4, 2007

(51) Int. Cl.
*B60N 2/42* (2006.01)
(52) U.S. Cl. .................................. 297/216.17
(58) Field of Classification Search ................ 297/329, 297/344.15, 344.12, 344.13, 344.14, 216.1, 297/216.16, 216.17, 423.1; 244/122 R; 114/363
See application file for complete search history.

(56) References Cited

U.S. PATENT DOCUMENTS

| | | | | |
|---|---|---|---|---|
| 2,893,470 A | | 8/1959 | Peller | |
| 4,128,217 A | * | 12/1978 | Mazelsky | 244/122 R |
| 4,423,848 A | * | 1/1984 | Mazelsky | 244/122 R |
| 5,309,861 A | | 5/1994 | Mardikian | |
| 5,324,095 A | * | 6/1994 | Yamauchi | 297/344.14 |
| 5,538,117 A | * | 7/1996 | Bouchez | 188/371 |
| 5,699,984 A | * | 12/1997 | Pinault | 244/122 R |
| 5,836,647 A | * | 11/1998 | Turman | 297/216.1 |
| 5,911,191 A | | 6/1999 | Burer | |
| 2005/0127730 A1 | * | 6/2005 | Bischoff | 297/344.12 |

* cited by examiner

*Primary Examiner*—Milton Nelson, Jr.
(74) *Attorney, Agent, or Firm*—Schweitzer Cornman Gross & Bondell LLP

(57) ABSTRACT

A personal support device having particular utility for use by personnel in high-performance surface watercraft comprises a bolster adapted and dimensioned to support an occupant for shock isolation from accelerations experienced by the vessel. The bolster is mounted by pivot means extending between the bolster and a back plate which is rigidly mounted to the vessel. The pivot means permit the bolster to pivot in an arc with respect to the back plate. A shock absorber extends between the back plate and bolster to dampen the accelerations which would otherwise be passed to the bolster by the pivot means from the back plate. The bolster is capable of supporting a user in a standing position or receiving a seat assembly to allow an occupant to be seated.

3 Claims, 3 Drawing Sheets

SHOCK-MITIGATING BOLSTER

The present invention relates to a new and improved personal support system, and particularly to a bolster construction having superior shock-mitigating characteristics which can be of significant value for use by personnel in high-performance surface watercraft.

BACKGROUND OF THE INVENTION

High performance surface watercraft, such as employed by the military, are capable of sustained high-speed operation. Such speeds subject the craft and its occupants to tremendous shock accelerations and forces as the craft is buffeted by the seas. Beyond the obvious difficulties that such forces create with respect to allowing the crew to perform their necessary duties, continued exposure to such forces can be hazardous and harmful to the craft's occupants.

The U.S. Navy MKU Special Operators Craft, for example, an 82 foot high-speed vessel, has a top speed of approximately 50 knots and a range of 500 nautical miles. It has a crew of 5 and is designed to carry up to 16 fully-equipped special aquatic forces personnel in addition to other payload and equipment. When traveling in a head sea direction peak vertical accelerations of up to 8 g can be experienced as the vessel traverses the waves at a nominal speed of 35 knots in 3-foot seas. See *High-Speed Craft Motions: A Case Study*, K. Haupt, Naval Surface Warfare Center, Norfolk, Va. The forces generated by such accelerations can be harmful to both personnel and equipment.

It is accordingly a purpose of the present invention to provide a personnel support device capable of providing protection against and absorbing high-level shock forces, such as may be developed as a result of high-speed water transit by a surface vessel to prevent them from being transmitted to an occupant of the device.

Yet a further purpose of the present invention is to provide a personnel support device capable of preventing such high-level shocks from reaching the occupant, whether in a standing or sitting position.

Still a further purpose of the present invention is to provide such a support device which is of rugged and dependable construction, capable of performing in a marine environment, and which is adjustable to accommodate users of varying weights.

BRIEF DESCRIPTION OF THE INVENTION

In accordance with the foregoing and other objects and purposes, a personnel support device of the present invention is in the form of a bolster assembly which provides a support mechanism for a user when in a standing position as well as being capable of supporting a seat structure for a user in the sitting position. The bolster comprises a frame which is resiliently supported by a mounting plate through a shock-absorbing interface. A pair of pivot arms provides the primary connection between the frame and mount, allowing the bolster frame to rotate in a vertical arc with respect to the mount. The mounting plate is in turn rigidly affixed to the structure through which the shocks are transmitted, such as a vessel's deck or superstructure. The frame-mounting plate interface also includes the parallel combination of a damper and spring, the response characteristics of which may be adjustable to allow tuning of the response of the system in accordance with use requirements. The combination of the damper and spring absorb accelerations transmitted to the pivot arms, damping a large portion of the resultant force and providing attenuated, controlled motion of the bolster frame in connection therewith. The inventive construction provides an extremely reliable and durable shock-absorbing system, providing superior comfort and safety to a user, allowing fatigue-free long duration travel aboard high-performance craft subject to continued high-level shocks.

BRIEF DESCRIPTION OF THE DRAWINGS

A fuller understanding of the present invention will be acquired upon consideration of the following detailed, but nonetheless illustrative disclosure of a preferred embodiment of the invention, when reviewed in association with the annexed drawings, wherein.

DETAILED DESCRIPTION OF THE INVENTION

Figure 1:
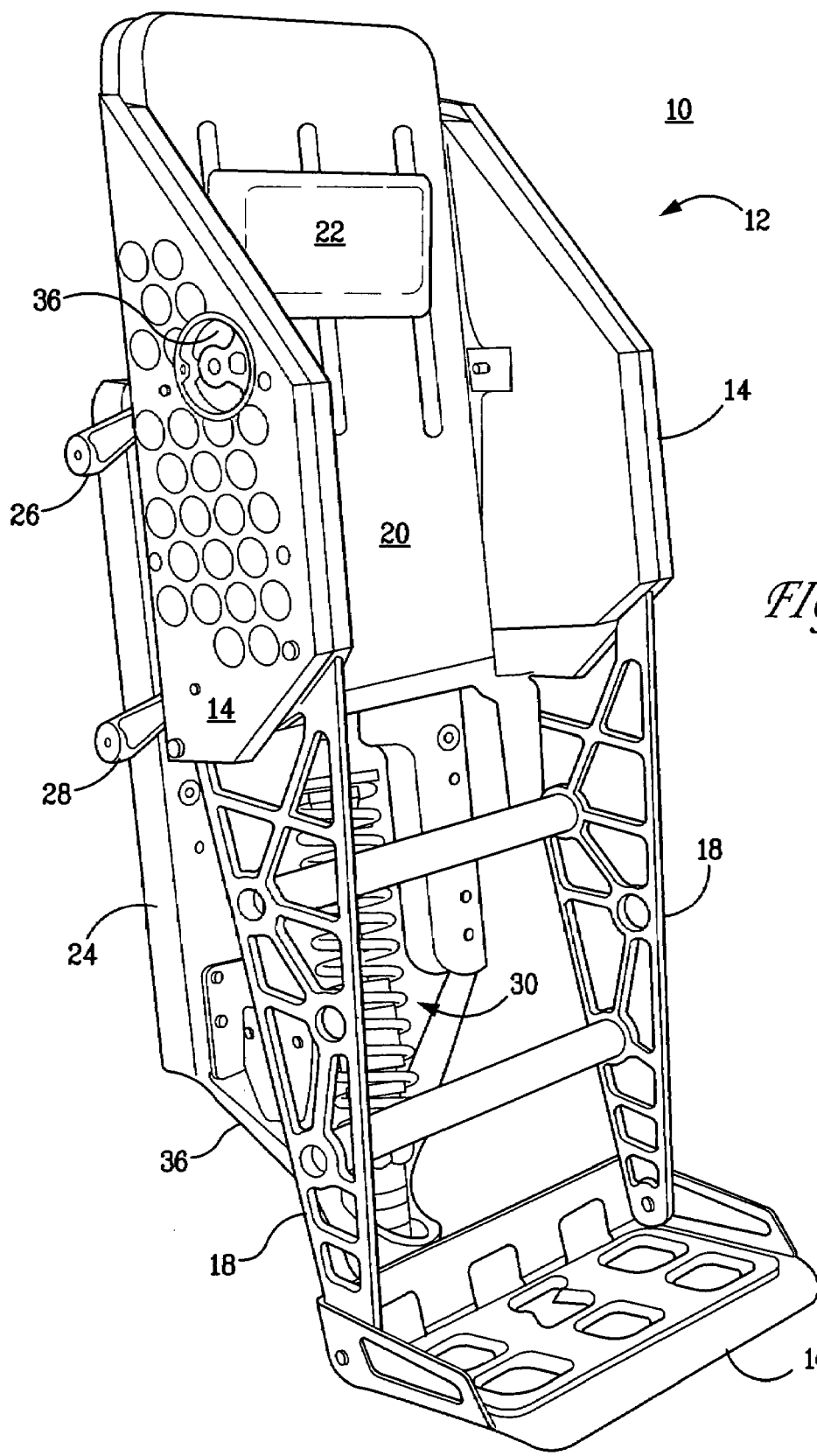
FIG. 1 is a perspective view of a shock-absorbing bolster of the present invention.

With initial reference to FIG. 1, shock-mitigating bolster device 10 depicts a unit configured to provide shock-absorption for a user in a standing position. Bolster frame 12 is of generally a U-shape construction, the user's torso being positioned between the side wings 14 of the frame. The user stands on footplate 16, which is mounted to frame side struts 18 joined to the bolster side wings. A lap belt (not shown) may be provided to retain the user within the confines of the bolster, while optional pivoting armrests (also not shown) may also be provided, and can be journaled in appropriate recesses 36 in the wings 14. The interior portion of the bolster frame is typically padded; the back cushioning 20 may be further provided with a vertically-adjustable lumbar support 22. The bolster frame is positioned and supported forwardly of back plate 24 by upper and lower pivot arm pairs 26, 28. Shock-absorber assembly 30 further connects the bolster frame with the back plate, and provides the active acceleration/shock-absorbing action. Both the bolster frame and back plate are preferably manufactured from an appropriate aluminum alloy, and may be provided with a hard coat anodized finish for further corrosion resistance. In lieu of padding and straps to accommodate a user in a standing position, frame 12 can carry a seat assembly to accommodate a user in a sitting position. Indeed, the seat itself can be foldable to allow both sitting and standing positions to be accommodated.

Figure 3:
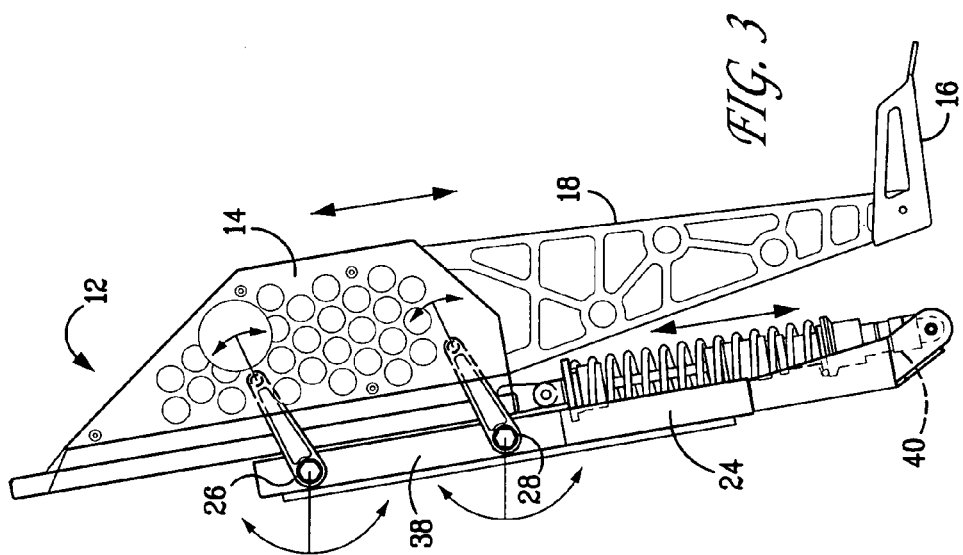
FIG. 3 is a side elevation view thereof.
Figure 2:
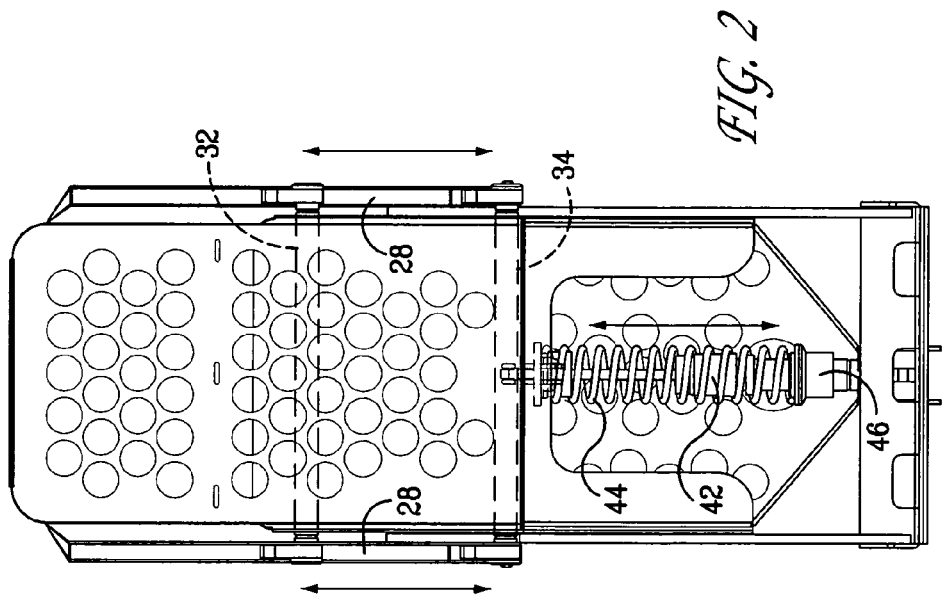
FIG. 2 is a front elevation view thereof.

As further detailed in FIGS. 2 and 3, each of the pivot arms of a pivot arm pair 26, 28 is mounted to an end of upper or lower pivot rod 32, 34, respectively, which in turn are journaled in mounting blocks on back plate 24. The mounting blocks may be mounted to the rear surface of the back plate, and may include low-friction bushings, such as formed from DELRIN, to support the bars. The bars extend through the peripheral side walls 38 of the back plate, which side walls are provided to increase the rigidity of the back plate. The forward or distal ends of the pivot arms 26, 28 are pivotally mounted to the bolster frame wings 14. The arms may have a pivot center-to-center length of approximately six inches, located and positioned to permit the frame to freely rotate through an arc of approximately 40°.

Back plate 20 is provided with a depending bracket 40, shock-absorber unit 30 being mounted between the bracket and the lower end of the back portion of bolster frame 12. Appropriate pivot mounts are employed to allow the arcuate travel of the bolster frame relative to the back plate to be accommodated. The shock absorber unit includes an integral piston-type dampener unit 42 and a parallel spring member 44, as known in the art. Preferably, the characteristics of the shock absorber are preset to accommodate both the weight of the bolster frame and an average occupant of 200 lbs. and to be responsive to shock range associated with the expected performance characteristics on the vessel on which the bolster is employed. A working displacement stroke of four inches, to be compatible with the four inch vertical bolster frame travel associated with a 40° degree rotation, is preferred. The shock absorber may further have an indicator to denote the level of compression of charging gas to provide an easily observable status indication. In addition, it may be provided with adjustment means 46 to adjust the degree of pressurization or loading to compensate for higher or heavier individuals. Shock absorbers of known construction, such as manufactured by Taylor Devices, Inc. of North Towanda, N.Y., have been found appropriate for use.

Figure 5B:
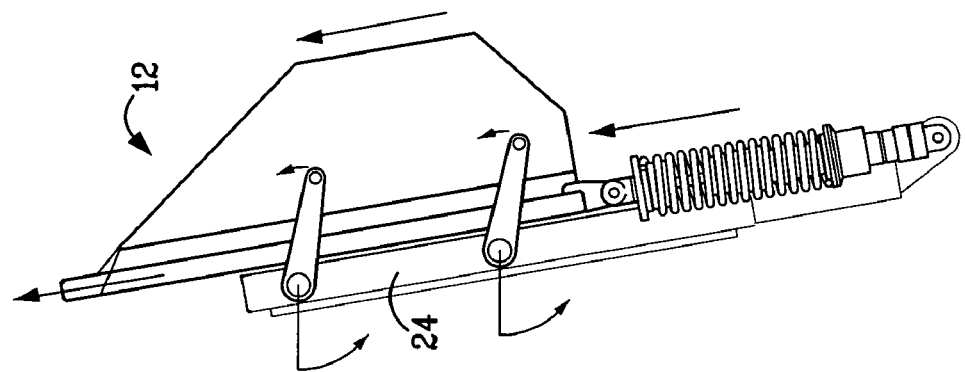
FIGS. 5A and 5B are side diagrammatic elevation views similarly depicting such operation.
Figure 5A:
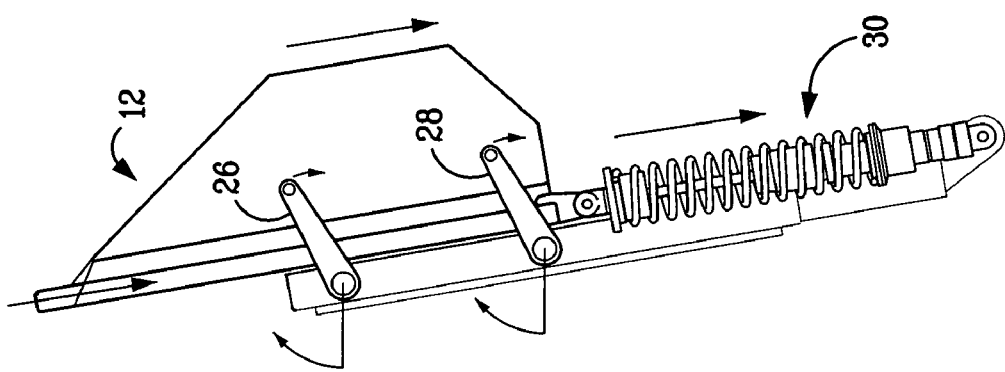
Figure 4B:
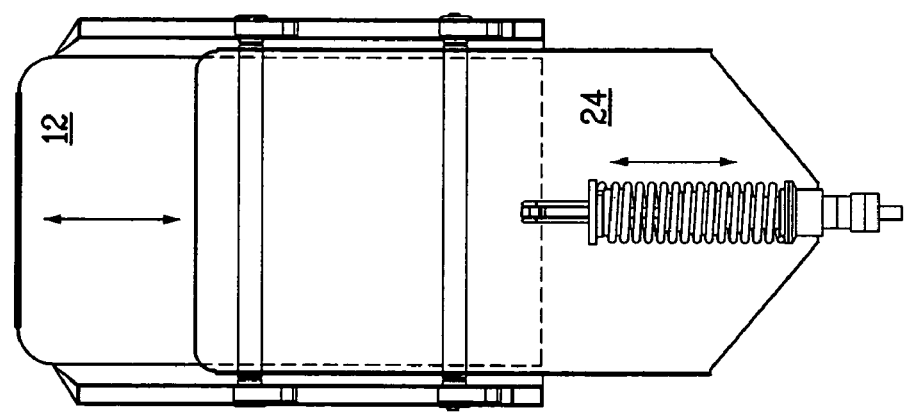
FIGS. 4A and 4B are diagrammatic rear elevation views illustrating the action of the shock-absorbing mechanism during operation.
Figure 4A:
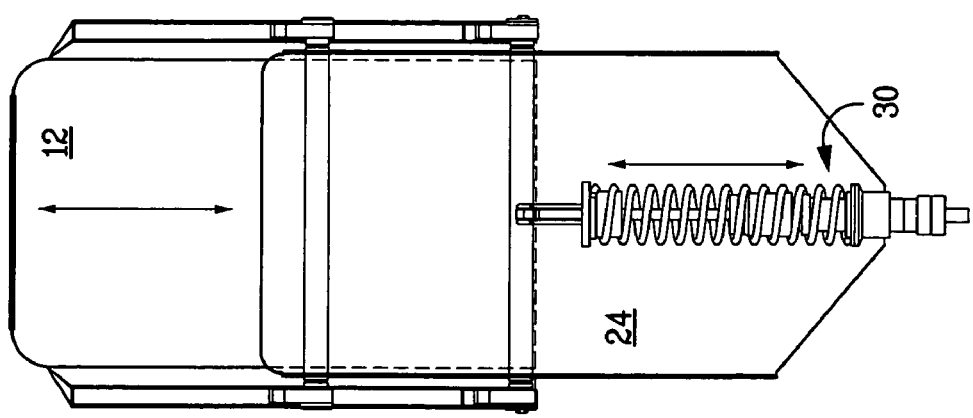

FIGS. 4A, B and 5A, B depict the operation of the bolster device. With an occupant in place, the shock absorber assembly 30 assumes an initial loading, and the bolster frame pivots to an intermediate position, as depicted in FIGS. 4A and 5A. As shocks are encountered by the vessel, the back plate 24 undergoes vertical accelerations, which are transmitted to the pivot arms 26, 28. As the pivot arms rotate in response to an acceleration, the acceleration is also passed to the shock absorber, which compresses or expands in accordance with the direction and magnitude of the acceleration, as illustrated in FIGS. 4B and 5B, damping the effects of the acceleration such than the resultant motion of the shock absorber piston, and thus the bolster frame to which it is attached, is attenuated. As the acceleration end, the shock absorber returns to its initial position, re-centering the bolster frame and occupant. Rather than passing the accelerations to the bolster frame, much of the acceleration energy is converted to heat, which is dissipated to the surrounding atmosphere. The shock absorber is chosen to have a duty cycle and dissipation rating appropriate to the amplitude and quantity of accelerations expected to be experienced in use.

We claim:

1. A personnel support device, comprising a back plate adapted to be rigidly mounted to a structure; a bolster adapted and dimensioned to support an occupant for shock isolation from accelerations experienced by the structure; pivot means extending between the back plate and the bolster to permit the bolster to pivot in an arc with respect to the back plate; and a shock absorber extending between the back plate and bolster, the pivot means comprising first and second sets of pivot arms, the bolster comprising a bolster frame having side wings and a footrest supported by side struts, the pivot arms being mounted to side walls of the back plate and to the side wings.

2. The personnel support device of claim 1 wherein the shock absorber comprises a parallel combination of a damper and spring.

3. The personnel support device of claim 2 wherein the shock absorber includes means for adjusting a preload to accommodate occupants of different weights.

* * * * *